United States Patent [19]

Beausoleil

[11] Patent Number: 5,247,389
[45] Date of Patent: Sep. 21, 1993

[54] NONLINEAR OPTICAL FREQUENCY CONVERTER

[75] Inventor: Raymond G. Beausoleil, Redmond, Wash.

[73] Assignee: Cygnus Laser Corporation, Duvall, Wash.

[21] Appl. No.: 899,652

[22] Filed: Jun. 15, 1992

[51] Int. Cl.⁵ .......................... H03F 7/04; H01S 3/109
[52] U.S. Cl. .................................. 359/326; 359/328; 359/330; 372/21; 372/22
[58] Field of Search ............... 359/326, 328, 329, 330; 372/21, 22

[56] References Cited

U.S. PATENT DOCUMENTS

| | | | |
|---|---|---|---|
| 4,272,694 | 6/1981 | Jacobs | 307/427 |
| 4,331,891 | 5/1982 | Rizzo | 307/427 |
| 4,346,314 | 8/1982 | Craxton | 307/427 |
| 4,510,402 | 4/1985 | Summers et al. | 307/427 |
| 4,618,957 | 10/1986 | Liu | 372/22 |
| 5,123,022 | 6/1992 | Ebbers et al. | 372/22 |

OTHER PUBLICATIONS

Eimerl, D., "High Average Power Harmonic Generation," Reprinted from: IEEE Journal of Quantum Electronics, vol. QE-23, No. 5, May 1987, pp. 575–592.
Eimerl, D., "Quadrature Frequency Conversion," Reprinted from: IEEE Journal of Quantum Electronics, vol. QE-23, No. 8, Aug. 1987, pp. 1361–1731.
1981 Laser Program Annual Report, Lawrence Livermore National Laboratory, MS date: Aug. 1982, pp. 7–1 and 7–2, UCRL-50021-81 Distribution Categories UC-21, 22, Available from National Technical Information Service, U.S. Department of Commerce, 5285 Port Royal Road, Springfield, Va. 22161.

Primary Examiner—Georgia Y. Epps
Attorney, Agent, or Firm—Christensen, O'Connor, Johnson & Kindness

[57] ABSTRACT

A general method which extends quadrature techniques to Type I nonlinear optical parametric interactions. In one embodiment, a pair of either uniaxial or biaxial birefringent nonlinear optical crystal elements are serially arranged and oriented so that each crystallographic axis in one conversion means is parallel to the corresponding axis in the second conversion means. Two colinear input fundamental laser fields with parallel polarizations propagate through both crystals, generating a sum-frequency output field. Between the two crystals, a harmonic waveplate is inserted that rotates only the polarization of the sum-frequency field generated in the first conversion means by 90° about its propagation axis. The net polarization rotation of each of the two residual fundamental waves which remain after the interaction in the first conversion means is zero. Therefore, the fundamental waves remain correctly polarized for efficient nonlinear optical conversion in the second conversion means, while the sum-frequency wave is no longer correctly phase-matched for back-conversion. Precise phase-matching may be accomplished either by tilting the assembly about its angularly sensitive axis ("critical" phase-matching) or by adjusting the temperature of the crystals ("non critical" phase-matching). In general, the polarization of the sum-frequency output field will be elliptical, but it can be linearized by tilting the assembly about its angularly insensitive axis.

14 Claims, 8 Drawing Sheets

NONLINEAR OPTICAL FREQUENCY CONVERTER

FIELD OF THE INVENTION

The present invention relates to nonlinear optical frequency conversion and, in particular, to techniques for efficiently producing very high nonlinear optical frequency conversion efficiencies.

BACKGROUND OF THE INVENTION

Optical harmonic generation has been known since the experiments of Franken et al. in 1961. Nonlinear optical frequency converters are particularly useful for laser systems which are capable of efficiently producing high-intensity optical fields at a long infrared wavelength, but not at shorter visible or ultraviolet wavelengths. The highest harmonic generation conversion efficiencies to date have been observed using Type II quadrature frequency conversion. This scheme uses two consecutive Type II frequency doubling crystals oriented so that the planes containing their optic axes and the beam propagation vectors are orthogonal. Since, under Type II phase-matching conditions, the input field is polarized at 45° with respect to this plane for the first crystal, the fundamental field which remains unconverted after passing through the crystal is correctly polarized for efficient conversion in the second crystal. Furthermore, the second harmonic field output from the first crystal is polarized incorrectly for optimum phase-matching in the second crystal (otherwise, back-conversion would occur); consequently, it will pass through the second crystal without loss (except for absorption and surface reflections).

Type I quadrature frequency conversion has not been demonstrated to date, because the polarizations of the fundamental input beams must be parallel. Consequently, either the fundamental fields which remain unconverted after passing through the first crystal are incorrectly polarized for efficient conversion in the second crystal (if it has been rotated by 90° relative to the first), or the harmonic field produced in the first crystal will be back-converted in the second crystal (if it has not been rotated by 90° relative to the first).

The overall efficiency of existing high average power visible laser systems is severely limited by the conversion efficiency of the harmonic generator. In the case of all-solid-state lasers, a high efficiency frequency converter will dramatically reduce the number and the cost of the needed diode pump lasers, as well as significantly reduce the operating costs of the overall laser system. Conventional moderate-efficiency frequency converters generally use a single crystal of potassium dideuterium phosphate (or KD*P) and Type II phase-matching. However, many modern nonlinear optical materials provide the most highly efficient conversion of infrared wavelengths to the visible (potassium dihydrogen phosphate, or KDP; lithium triborate, or LiB$_3$O$_5$; 5% magnesium-oxide-doped lithium niobate, or 5% MgO:LiNbO$_3$; and potassium niobate, or KNbO$_3$) and visible wavelengths to the ultraviolet (barium metaborate, or BaB$_2$O$_4$; and KD*P) under Type I phase-matching conditions. These materials have sufficiently low threshold powers that highly efficient frequency converters could be produced for a wide variety of industrial, government, and medical applications.

SUMMARY OF THE INVENTION

The present invention provides a technique for highly efficient optical frequency conversion using Type I phase-matching. The invention may be used, for example, to convert light at infrared wavelengths to light at visible and ultraviolet wavelengths. A wide variety of nonlinear optical conversion means can be incorporated into devices based on this invention.

The present invention comprises a frequency conversion apparatus for receiving an optical input beam having a first frequency, and for producing an optical output beam at a second frequency equal to twice the first frequency. The apparatus comprises first nonlinear conversion means to receive the input beam. In a first preferred embodiment, the first conversion means is constructed and oriented for Type I phase-matching, such that a portion of the input beam is converted into a first higher frequency beam at the second frequency, with a polarization normal to the polarization of the input beam. The first higher frequency beam leaves the first conversion means along with a residual beam comprising a portion of the input beam not converted into the first higher frequency beam.

This embodiment also comprises waveplate means and a second nonlinear conversion means. The waveplate means produces a relative rotation between the polarization of the first higher frequency beam and the polarization of the residual beam. These beams then enter the second conversion means, which is constructed and oriented such that a portion of the residual beam is converted into a second higher frequency beam at the second frequency. The first and second higher frequency beams comprise the output beam, and have polarizations that are orthogonal to one another.

Other embodiments are also described in which one of the conversion means uses Type I phase-matching, while the other conversion means uses Type II phase-matching. In both cases, a waveplate is used to perform a relative rotation of the polarizations of the first higher frequency beam and the first residual beam. A further embodiment is described which uses a single nonlinear conversion means, and a mirror that causes light to make two passes through the conversion means and the waveplate means.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The general principles of the present invention can be described with reference to FIG. 1, which depicts second harmonic generation using negative uniaxial crystals arranged for Type I phase-matching. However, as will become more apparent below, the invention is also applicable to positive uniaxial and biaxial crystals, and to combinations of Type I and Type II phase-matching.

Figure 1:
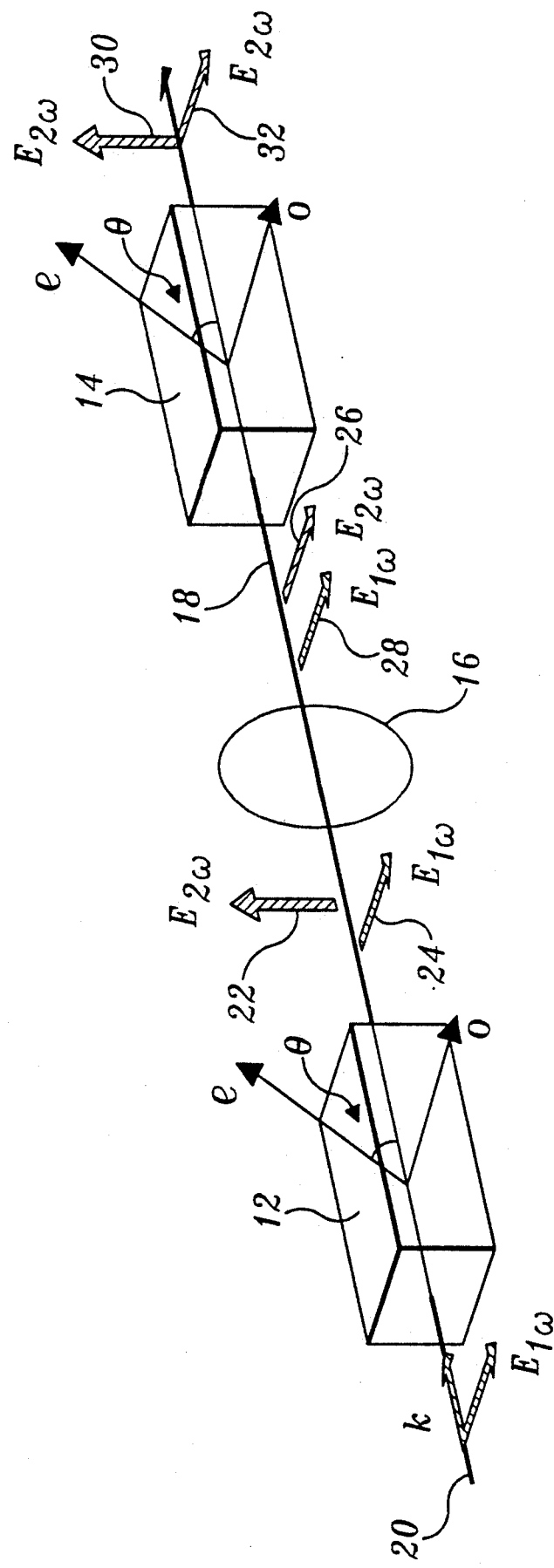
FIG. 1 is an optical schematic view of a first preferred embodiment of the invention.

The second harmonic generation apparatus shown in FIG. 1 comprises nonlinear optical conversion means 12 and 14, and harmonic waveplate 16. The waveplate is positioned between the crystals, and all three components are positioned along optical path 18 along which light travels through the system. A fundamental input beam 20 has polarization $E_{1\omega}$ and propagation vector k that is parallel to path 18. First crystal 12 is constructed for Type I phase-matching at the frequency of the input beam. The first crystal has an extraordinary axis e that is oriented at an angle $\theta$ relative to path 18, and that is perpendicular to the input beam polarization $E_{1\omega}$. The angle $\theta$ is selected to produce Type I phase-matching within crystal 12, as further described below. As the fundamental input beam propagates through crystal 12, a second harmonic beam is generated with a polarization $E_{2\omega}$ that is perpendicular to $E_{1\omega}$, and that lies in the plane formed by the propagation vector k and the extraordinary axis e of crystal 12. Thus two beams emerge from crystal 12 traveling along path 18: the second harmonic beam at frequency $2\omega$, having a polarization symbolized by arrow 22 in FIG. 1, and a residual beam made up of that portion of the input beam that was not converted in crystal 12. The residual beam has a polarization symbolized by arrow 24 in FIG. 1.

It is desirable to increase the efficiency of the conversion of the fundamental input beam into the second harmonic beam. However, simply increasing the length of crystal 12 may actually reduce the total conversion efficiency, by causing a fraction of the energy carried by the second harmonic beam to be converted back into the fundamental input beam. To minimize back conversion, a pair of crystals 12 and 14 are used, with harmonic waveplate 16 positioned between them. In general, the function of waveplate 16 is to alter the relative polarizations of the second harmonic and residual beams, so as to permit a portion of the residual beam to be further converted into the second harmonic beam by crystal 14, while preventing back conversion of the second harmonic beam produced by first crystal 12.

In the embodiment shown in FIG. 1, the function of waveplate 16 is to rotate the polarization 22 of the second harmonic beam relative to the polarization 24 of the residual beam, such that they are parallel to one another, as indicated by arrows 26 and 28 respectively. The second harmonic beam and the residual beam then enter second crystal 14. In this embodiment, crystal 14 is oriented identically to crystal 12, to produce Type I phase-matching. Thus a portion of the residual beam from crystal 12 will be converted into an additional second harmonic beam having polarization $E_{2\omega}$ indicated by arrow 30 in FIG. 1. However, the second harmonic beam produced by crystal 12 will not be properly polarized for precise phase-matching in second crystal 14, thereby preventing back-conversion. Two second harmonic wave components 30 and 32 therefore emerge from second crystal 14. Their relative phases can be adjusted (for example) by slightly rotating the first crystal in the angularly insensitive direction (that is, perpendicular to the plane containing the extraordinary axis and the propagation vector). In this way, the polarization of the net second harmonic wave (a coherent superposition of the two harmonic components) can be continuously adjusted from fully circular to fully linear. The small residual fundamental beam emerging from the second crystal can be deflected into a beam dump using a harmonic beamsplitter.

In the illustrated embodiment, waveplate 16 is selected to be a full-waveplate at the fundamental input frequency, and a net half-waveplate at the second harmonic frequency. This allows the residual beam to pass through waveplate 16 unaffected, as illustrated by arrows 24 and 28, while rotating the polarization of the second harmonic beam by 90°, as indicated by arrows 22 and 26. When this technique is used, crystal 14 is oriented identically to crystal 12. However, a wide variety of other approaches can be taken. For example, second crystal 14 can be rotated relative to first crystal 12 by 90°, and the waveplate can provide a half-wave phase shift for the fundamental wave, and a full wave for the second harmonic. Biaxial crystals could be used in place of uniaxial crystals.

A more detailed discussion of the physical principles upon which this invention is based is given below.

Parametric Three-Wave Mixing

In general, a parametric three-wave mixing process in a nonlinear medium is a process in which first and second input beams or fields are combined to produce a third beam or field at a frequency equal, for example, to the sum of the frequencies of the two input beams. Second harmonic generation can be considered a special case of this process, in which the first and second input beams are identical to one another, and in which the output beam therefore has double the frequency of the input beam. In second harmonic generation, as in all the three-wave mixing processes, the output field is produced continuously throughout the length of the crystal. To prevent the output field produced at one point in the crystal from interfering with the output field produced at other points in the crystal, it is necessary for the output field to have the same wavelength and phase throughout the crystal. This can be generalized to three-way mixing by the requirement that if $k_1$, $k_2$, and $k_3$ are the propagation vectors of the two input beams and the output beam, where $k_j = 2\pi(n_j/\lambda_j)$, that $$\Delta k = k_3 - k_1 - k_2 = 0 \qquad (1)$$

Achieving the equality of Equation 1 is termed phase-matching.

Figure 2:
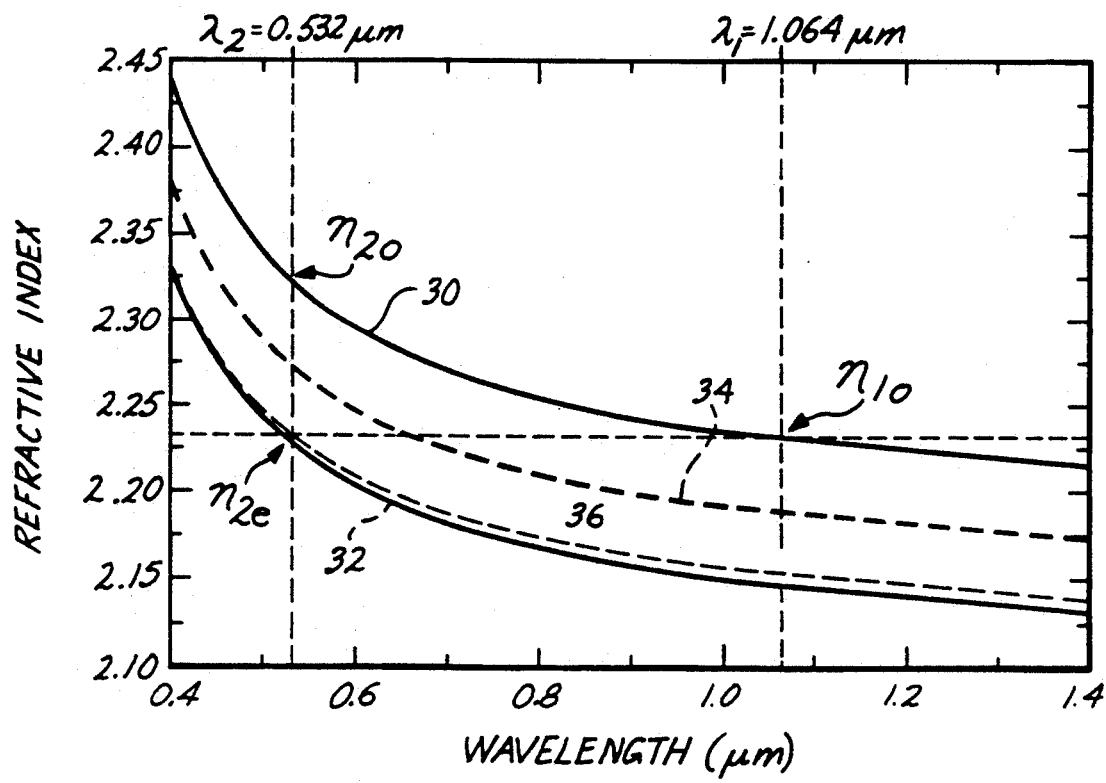
FIG. 2 is a graph of the ordinary and extraordinary refractive indices of 5% MgO:LiNbO$_3$ as a function of wavelength at 30° C.

One of the most common techniques for realizing perfect phase-matching for plane waves (i.e., $\Delta k = 0$) is angle-tuning the effective birefringence of a uniaxial or biaxial crystal. As an example, FIG. 2 illustrates second harmonic generation from a fundamental Frequency of $\lambda_u$ of 1.064 microns, to a second harmonic frequency $\lambda_2$ of 0.532 microns, using a negative uniaxial crystal, e.g., 5% MgO:LiNbO$_3$. Curves 30 and 32 illustrate the ordinary and extraordinary refractive indices, respectively, of this crystal, as a function of wavelength. Since LiNbO$_3$ is a negative uniaxial crystal, at all wavelengths the ordinary index is greater than the extraordinary index. In this case, the first crystal (i.e., crystal 12 in FIG. 1) is oriented such that the angle between the fundamental input propagation vector k and the extraordinary crystal axis is $\theta$. The input beam is polarized so that it is perpendicular to the extraordinary axis. Then the refractive index of the input wave is $n_{1o}$, or the ordinary index at wavelength $\lambda_1$. However, the polarization vector of the second harmonic output beam will lie in the plane formed by the propagation vector and the extraordinary axis. The effective extraordinary index of the second harmonic wave is then given by $$n_2(\theta) = \frac{n_2}{\sqrt{1 + [(n_{2o}/n_{2e})^2 - 1]\sin^2\theta}} \quad (2)$$

where $n_{2o}$ and $n_{2e}$ are the ordinary and extraordinary refractive indices at $\lambda_2$, respectively. As the angle $\theta$ is varied from 0° to 90°, $n_2(\theta)$ decreases monotonically from $n_{2o}$ to $n_{2e}$. FIG. 2 shows the effective refractive index at 45° (curve 34) and at 77.2° (curve 36). At an angle of 77.2°, the refractive index for the second harmonic beam at 0.532 microns (equation 2) is exactly equal to the refractive index of the fundamental beam ($n_{1o}$) at 1.064 microns. Thus 77.2° is the phase-matching angle ($\Delta k=0$) for these wavelengths and material. In general, for Type I frequency doubling in a negative uniaxial crystal, the phase-matching angle $\theta$ can be found by requiring that $n_2(\theta)=n_{1o}$, giving $$\sin^2\theta = \frac{(n_{2o}/n_{1o})^2 - 1}{(n_{2o}/n_{2e})^2 - 1} \quad (3)$$

Figure 3:
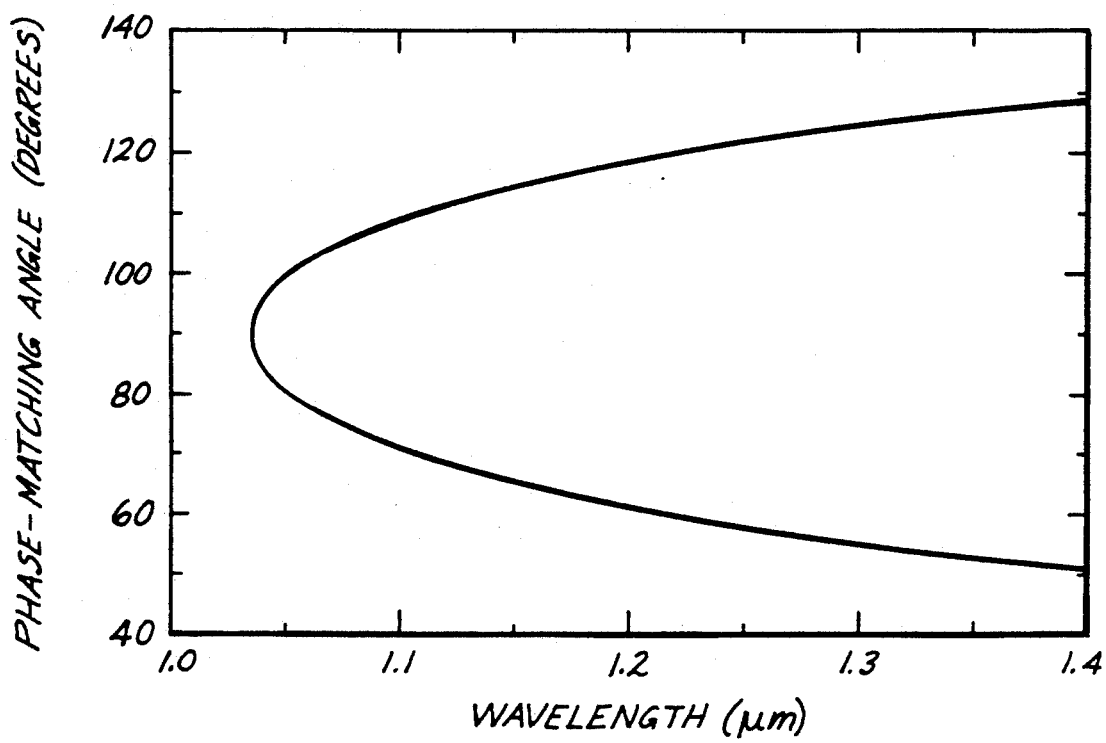
FIG. 3 is a graph of the Type I second-harmonic-generation phase-matching angle in 5% MgO:LiNbO$_3$ as a function of wavelength at 30° C.

In FIG. 3, the phase-matching angle $\theta$ for Type I 5% MgO:LiNbO$_3$ has been plotted as a function of wavelength at 30° C.

High Efficiency Second Harmonic Generation

In the case of Type I second harmonic generation (which is SHG), a single linearly polarized input fundamental beam produces a linearly polarized second harmonic output beam. If the fundamental polarization is parallel to the ordinary (extraordinary) axis, then the second harmonic polarization will be parallel to the extraordinary (ordinary) axis. In this case, since there is only one input electric field, we have $\lambda_3=\lambda_1/2$, and $n_3=n_1$. For this process, the conversion efficiency $\eta$ can be written.

$$\eta = \eta_{max} sn^2 [\sqrt{\eta_0/\eta_{max}}, \eta_{max}^2] \quad (4)$$

Type II SHG is actually sum-frequency mixing using two input waves that have the same wavelength. In general, for Type II SHG we have $\lambda_1=\lambda_2$, $\lambda_3=\lambda_1/2=\lambda_2/2$, and $n_3=(n_1+n_2)/2$. In other words, phase-matching is achieved when the refractive index of the second harmonic wave is equal to the *average* of the refractive indices of the first harmonic waves. In practice, both waves are provided by the same fundamental input beam; the polarization of the input beam is then aligned at an angle of 45° relative to the plane containing the beam propagation vector and the extraordinary axis of the nonlinear crystal. If we assume that photon balance has been achieved in this way, then $I_1(0)=I_2(0)=I_0/2$, and Equation (4) above describes Type II SHG as well.

Figure 4:
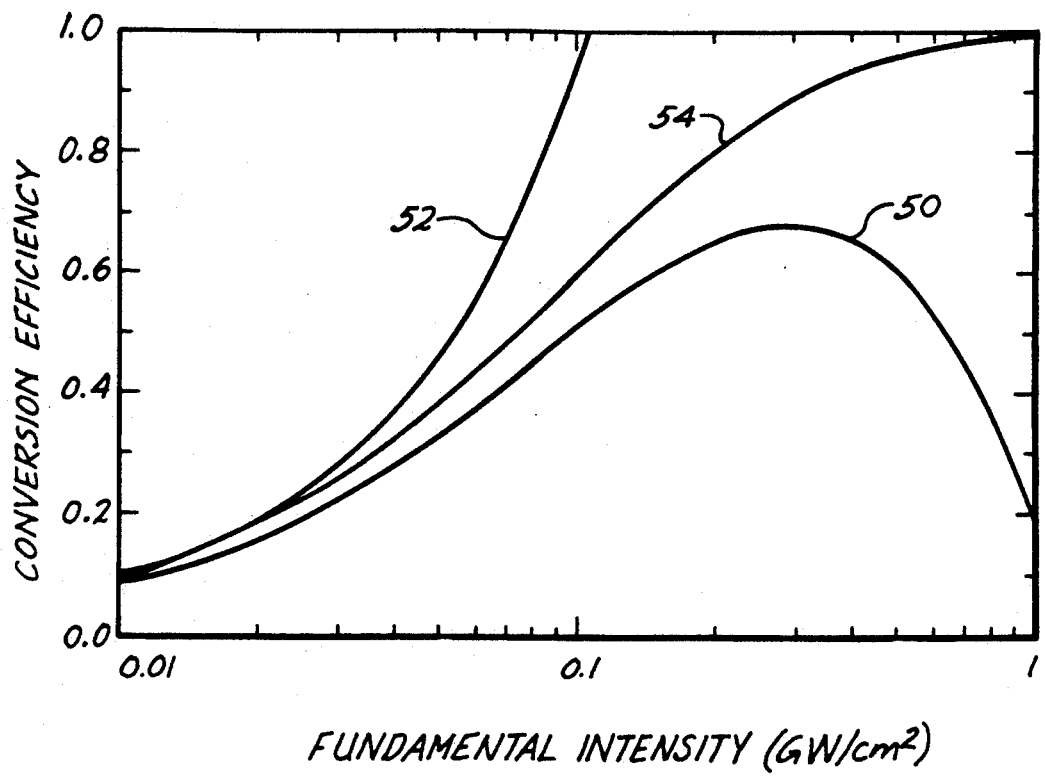
FIG. 4 is a graph comparing the two most common SHG approximations with the exact result for KD*P.

In FIG. 4, curve 50 is the plot of Equation (4) for the most commonly available frequency doubler, which employs Type II SHG in KD*P. Note that for finite dephasing and high intensities for the fundamental beam, the conversion efficiency is limited to approximately 60% by back-conversion of the second harmonic to the fundamental. We discuss below the important consequences of this behavior for high-efficiency second harmonic generation.

For comparison, two common approximations to Equation (4) have also been included in FIG. 4. Curve 52 represents a "no depletion" approximation that is valid only under low drive conditions, where the fundamental pump intensity is not depleted significantly. In this case, Equation (4) simplifies to $\eta=\eta_0\sin c^2(\delta)$, where $\sin c(x) = \sin(x)/x$. Under this approximation (which generally fails very badly for conversion efficiencies greater than 10–20%), the efficiency grows linearly with the fundamental input intensity, and quadratically with the crystal length. The "no dephasing" approximation is valid only under the experimentally unrealizable condition of zero dephasing. In this case, we include pump depletion and find $\eta=\tan h^2\sqrt{\eta_0}$. As the drive increases, this expression incorrectly predicts that the conversion efficiency can become arbitrarily close to unity monotonically.

Figure 5:
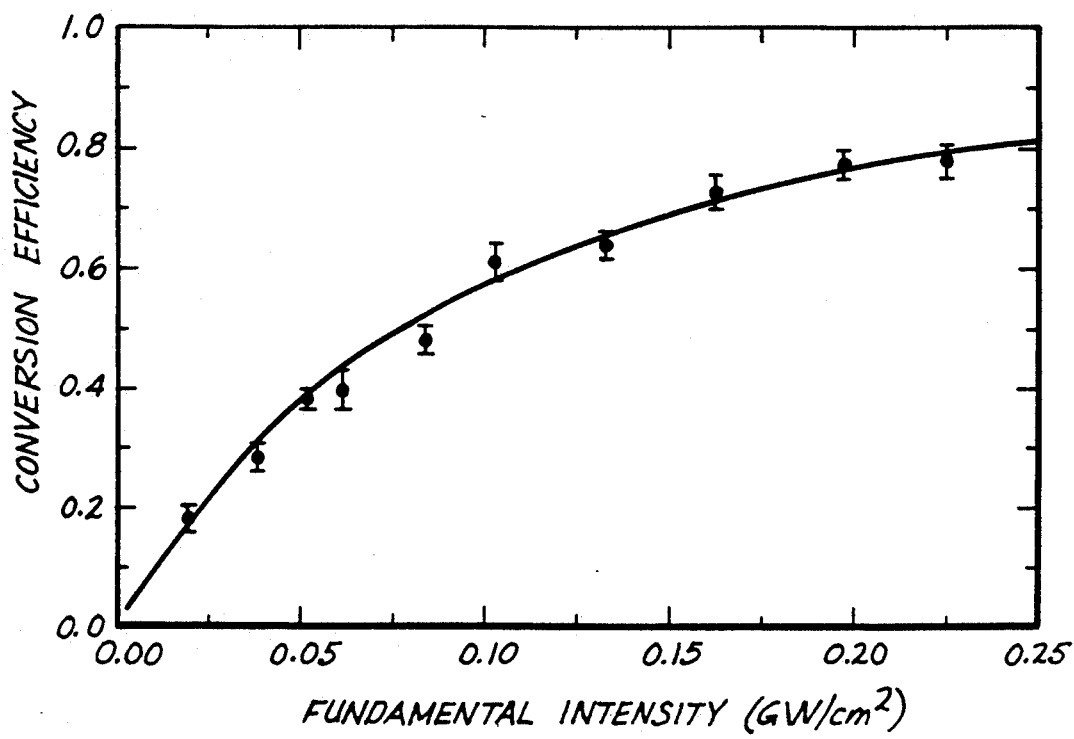
FIG. 5 is a graph comparing Cygnus Laser's experimental results with our extension of Eimerl's phenomenological model (solid line)

Significantly, neither of these approximations predicts the reduction of the conversion efficiency due to back-conversion of the second harmonic at high drive intensities. Consequently, computations based on these approximations *cannot* accurately predict the optimum geometry of the nonlinear crystal. Instead, Equation (4) can be used directly with a Gaussian beam approximation to accurately model and optimize the system performance. In this model, the fundamental electric field is represented by a coherent superposition of plane waves which sum to a diffracting wave. In this way, the input beam is approximated by a "cone" of rays, each of which forms an angle $\Delta\theta$ with the optical axis defined by the phrase-matching angle $\theta$. Curve 54 in FIG. 4 was produced using such a model. This model has been verified by experiments conducted with a 5-mm Type II KTP crystal. An ordinary Q-switched Nd:YAG laser (Spectra Physics DCR-2 with a filled-in-beam retrofit) was used, at a 10-Hz repetition rate. No special care was taken to spatially filter the fundamental input beam, nor were any intracavity optical elements used to smooth its temporal profile. In fact, the intensity of the multi-longitudinal-mode input pulse had a modulation depth of approximately 50%. FIG. 5 compares the results of this experiment with the model represented by curve 54 in FIG. 4. As shown, excellent agreement was obtained between the results of the experiment and model. (The solid line in FIG. 5 was *not* the result of a least-squares fit to the data; rather, it was generated directly by the numerical model.)

Figure 6:
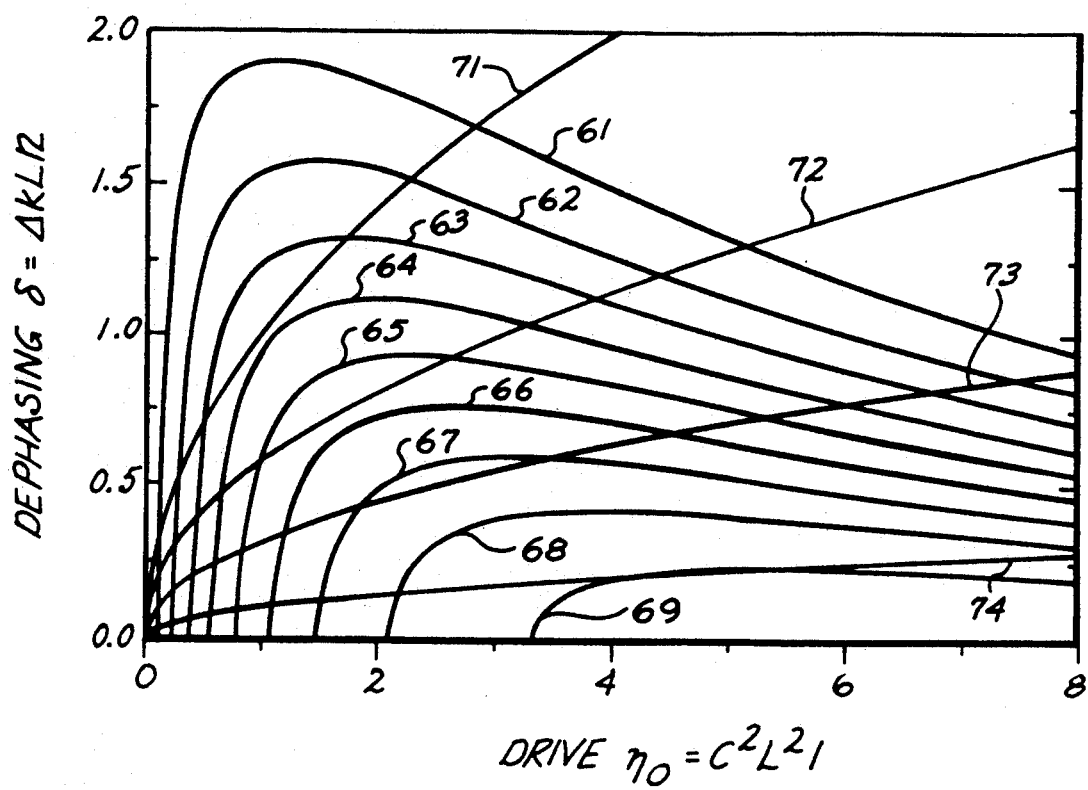
FIG. 6 is a contour plot of conversion efficiency as a function of drive and dephasing.

This treatment of the harmonic generation problem has profound implications for system performance optimization. FIG. 6 illustrates the relationship between conversion efficiency $\eta$, drive $\eta_0$, and dephasing $\delta$. In particular, curves 61-69 show contour plots for conversion efficiencies of 0.1 (curve 61) through 0.9 (curve 69). Since both $\eta_0$ and $\delta$ depend on the crystal length L, the length can be eliminated to obtain $\delta = \sqrt{\eta_0/B}$, where $B = (4\pi/N^2)(W_s/W_i)P_0/P_{th}$ is the laser brightness, $P_0 = I_0 \pi W_s W_i/4$ is the fundamental input power in an elliptical beam, $W_i$ is the height of the crystal aperture perpendicular to the angularly sensitive tuning plane, and $P_{th} = (\beta_\theta \lambda_1/n_1 C)^2$ is the threshold power, the most fundamental figure of merit for a harmonic generator material. Curves 71-74 are contour plots for values of B of 1, 3, 10, and 100 respectively. For a second harmonic generator that is limited solely by angular dephasing, the maximum conversion efficiency is therefore a function of the laser brightness only:

$$\eta_{max} = 1 + 1/2B - \sqrt{(1 + 1/2B)^2 - 1}. \quad (5)$$

Therefore, the threshold power is approximately the peak fundamental power for a beam with $N = \sqrt{2\pi} \approx 2.5$ which must be input to the crystal to achieve 50% conversion efficiency.

If the alignment of the input polarization for a Type II second harmonic generator is imperfect, then Equation (5) must be modified. Suppose that the relative angle between the polarization of the input laser beam and the plane containing the laser propagation vector and the extraordinary axis of the nonlinear crystal is $$\phi = \pi/4 + \Delta\phi \phi = \pi/4 + \Delta\phi.$$

Then $I_1(0) = I_0(1 - \sin 2\Delta\phi)/2$, $I_2(0) = I_0(1 - \sin 2\Delta\phi)/2, I_2(0) = I_0(1 - \sin 2\Delta\phi)/2,$ $\gamma^2 = 1/\cos^2 2\Delta\phi$, and $\eta_0 = (CL)^2 I_0 \cos^2 2\Delta\phi \cdot \eta_0 = (CL)^2 I_0 \cos^2 2\Delta\phi.$ We now define the optimum dephasing in terms of the optimum drive as $\delta = \sqrt{N_o/B} \cos^2 2\Delta\phi$, so that the maximum efficiency is given by $I_1(0) = I_0(1 - \sin 2\Delta\phi)2$, $$\eta_{max} = 1 + 1/B - \sqrt{(1 + 1/2B)^2 - \cos^2 2\Delta\phi}. \quad (6)$$

Figure 7:
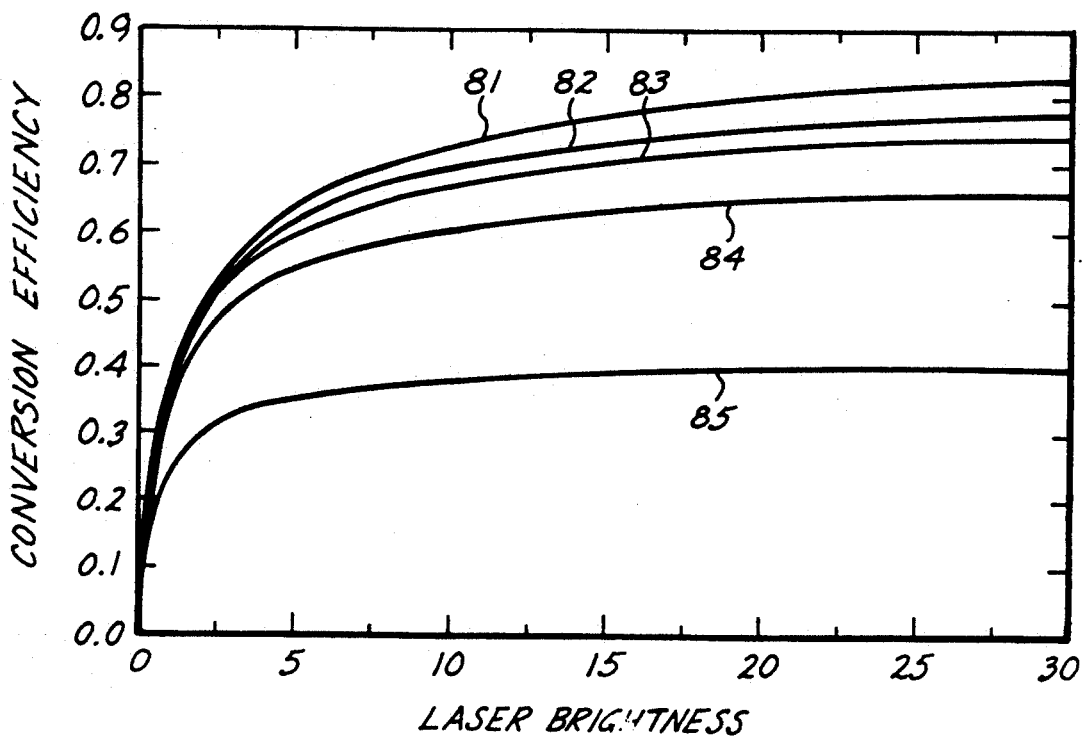
FIG. 7 is a graph of the maximum conversion efficiency as a function of the laser brightness B for several values of the Type II misalignment angle $\Delta\phi$.

In FIG. 7, curves 81-85 illustrate Equation (6) for misalignment angles $\Delta\phi$ of 0, $\pi/40$, $\pi/30$, $\pi/20$ and $\pi/10$. Note that even misalignments as small as a few degrees can reduce the Type II SHG conversion efficiency by 10-20%.

For fixed coupling, angular sensitivity, and input power, the drive and dephasing are determined exclusively by the crystal *shape*. To determine the optimum crystal shape, we merely trace out a parabola of constant brightness in FIG. 6, and then find the *unique* point ($\eta_0$, $\delta$) of maximum efficiency along that parabola.

$$\sqrt{\frac{\eta_o}{\eta_{max}}} = K(\eta_{max}^2) = \quad (7)$$

$$\int_0^{\pi/2} \frac{d\theta}{\sqrt{1 - \eta_{max}^2 \sin^2 \theta}} \approx \frac{\pi}{2\eta_{max}} \sqrt{\ln\left(\frac{1}{1 - \eta_{max}^2}\right)},$$

where K(m) is the complete elliptic integral of the first kind. Once the drive has been determined, then the optimum length can be computed using the expression $L = (\pi\delta/N)(n_1/\beta_{74}\lambda_1)W_s$.

It is crucial to note that an efficiency higher than the optimum value $\eta_{max}$ cannot be achieved without increasing the laser brightness (i.e., increasing the input laser power); *tighter focusing of the input beam will not increase the conversion efficiency*. For example, since a beam demagnification by a factor of M causes $W_s \rightarrow W_s/M$ and $W_i \rightarrow W_i/M$, the same optimum point on the contour can be reached by allowing $L \rightarrow L/M$. The minimum input beam area and crystal length are limited by the damage threshold of either the crystal antireflection coating or the crystal itself (whichever is lower); all input beams with larger area are equivalent in performance.

We have neglected absorption in our discussion of conversion efficiency because, if the absorption is weak, the efficiency shown in FIG. 4 is reduced slightly (due to energy loss), but the overall shape of the curve is not changed significantly (due to thermal dephasing). Consequently, the effects of absorption on the system performance can be estimated simply by reducing by appropriate amounts the fundamental and second harmonic output intensities predicted using Equation (3). However, a potentially more serious consequence of even weak absorption is the deposition of heat in the crystal, which can induce focusing variations due to small changes in the local refractive index. The contribution of crystal heating to the overall dephasing can be estimated by $\delta_T = \beta_T \Delta T L/8$, where $\beta_T$ is the thermal sensitivity of the crystal, the temperature difference between the center of the crystal and the nearest side of the crystal (assumed to be a distance $W_i/2$ from the crystal center) is $\Delta T = (W_i/W_s)\alpha_l P_{av}/8K$, $P_{av}$ is the average fundamental input power, and K is the crystal conductivity. Hence $$\delta_T = \frac{P_{av}}{2\pi W_m} \frac{W_i}{W_s} L, \quad (8)$$

where $W_m = 8K/\alpha_l \beta_T$ is the thermal dephasing parameter, useful for characterizing the sensitivity of a material to perturbations caused by thermal loading. The average power that a harmonic generator can tolerate without suffering significant thermal degradation is proportional to $W_m$, and inversely proportional to the scale of the relevant thermal gradients.

The above discussion applies to both continuous-wave and pulsed second harmonic generation, provided that the group velocities of the three waves are approximately equal (within a few percent) and that the input pulse duration is not much shorter than 1 ns. Thus the preceding system performance analysis remains valid for pulsed input lasers. While a closed form analytic solution cannot be obtained for the total second harmonic output energy given the fundamental input pulse parameters, a numerical procedure can be used instead. The input pulse must first be divided into many steps in time, with each step containing some known fraction of the total fundamental input energy. Equation (4) can then be applied individually to each step, using the average intensity over the step size as the fundamental input intensity. The contributions of each time step must be summed to obtain the total second harmonic energy generated in the crystal, and then the performance analysis can be applied to the total energy. Such an analysis has been carried out explicitly during the design of the frequency doubler proposed here. However, we have found empirically that an approximate first-order design may be developed using the average intensity of the pulse as the continuous-wave input intensity, *if the full width at the 1/e² points is used to calculate that average*, rather than the full width at the half maximum (FWHM) points. The thermal contribution to the average dephasing also has a slightly different form for a pulsed system; if the reciprocal of the pulse repetition rate $f_R$ is greater than the thermal time constant of the crystal, then the thermal load in the crystal quickly reaches steady-state, causing a temperature difference $\Delta T = (H/W)\alpha_1 f_R E_{in}/8K$, where $E_{in}$ is the fundamental input energy of the pulse.

Quadrature Second Harmonic Generation

As shown in FIG. 4, the fundamental limitation to highly efficient frequency conversion of high-energy pulsed laser beams is the back-conversion of the second harmonic at high drive intensities. Based on the analysis of the previous section, the crystal length could be shortened to reduce back-conversion, but then the lower-intensity wings of the input pulse could not be converted efficiently. The solution to this problem is the technique of quadrature frequency conversion, which uses two crystals for second harmonic generation instead of one.

In the embodiment of FIG. 1, the quadrature scheme uses two consecutive Type I doubling crystals oriented so that the planes containing their extraordinary axes and the beam propagation vectors are parallel. Since, in Type I phase-matching, the incident wave is polarized at 90° with respect to this plane, then the fundamental field which remains unconverted after passing through the first crystal is correctly polarized for efficient conversion in the second crystal. Furthermore, after passing through the harmonic waveplate placed between the two crystals, the second harmonic field output from the first crystal is polarized *incorrectly* for interaction in the second crystal (which would otherwise lead to back-conversion); consequently, it will pass through the second crystal without loss (except for absorption and surface reflections). If the conversion efficiencies of the two crystals are $\eta_1$ and $\eta_2$ respectively, then the total conversion efficiency of the system is $$\eta = \eta_1 + (1 - \eta_1)\eta_2. \quad (9)$$

The polarization of the total second harmonic field emerging from the second crystal can be controlled by adjusting the relative phase between the pulse produced in the first crystal and the pulse produced in the second. This can most easily be accomplished by alignment of the first crystal in the insensitive (i.e., non-angle-tuned) direction.

Figure 8:
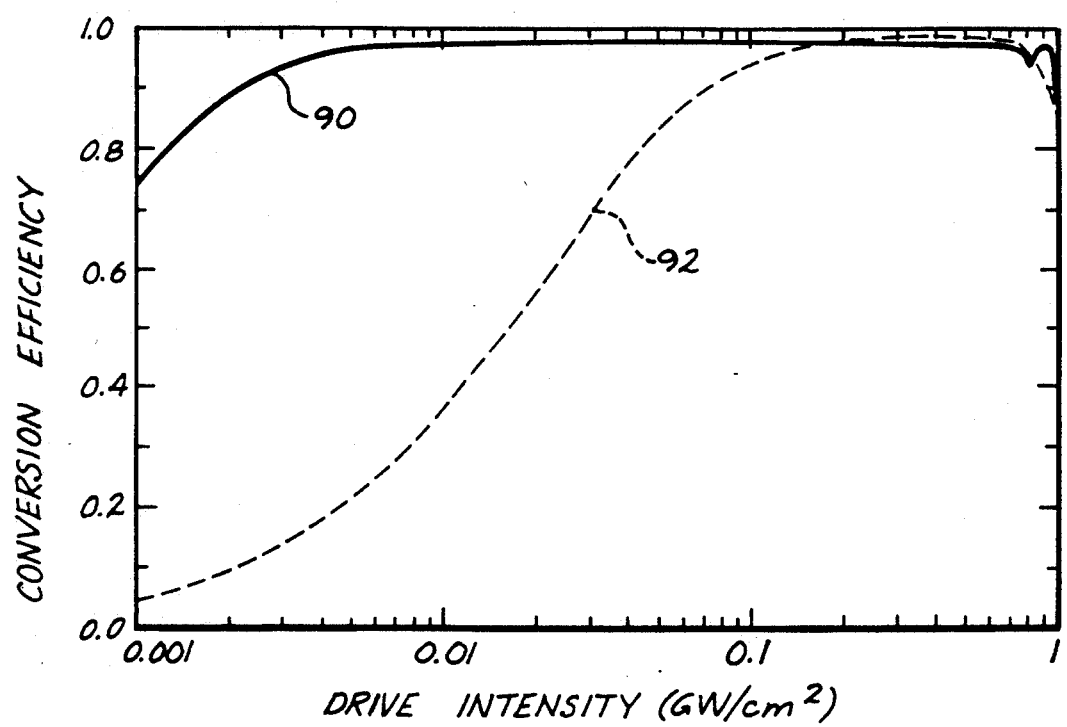
FIG. 8 is a plot of the dynamic range of a Type I quadrature $KNbO_3$ frequency doubler for 1064 nm input radiation.

A plot of the conversion efficiency of a Type I quadrature temperature-phase-matched $KNbO_3$ frequency doubler as a function of the fundamental input intensity is given in FIG. 8. The solid curve 90 predicts the performance of the quadrature doubler, while the dashed curve 92 describes the conversion efficiency typical of a single $KNbO_3$ crystal. Note that the quadrature doubler provides very efficient conversion over a wide range of fundamental input intensities, while the dynamic range of the single-crystal doubler is much narrower.

Figure 9:
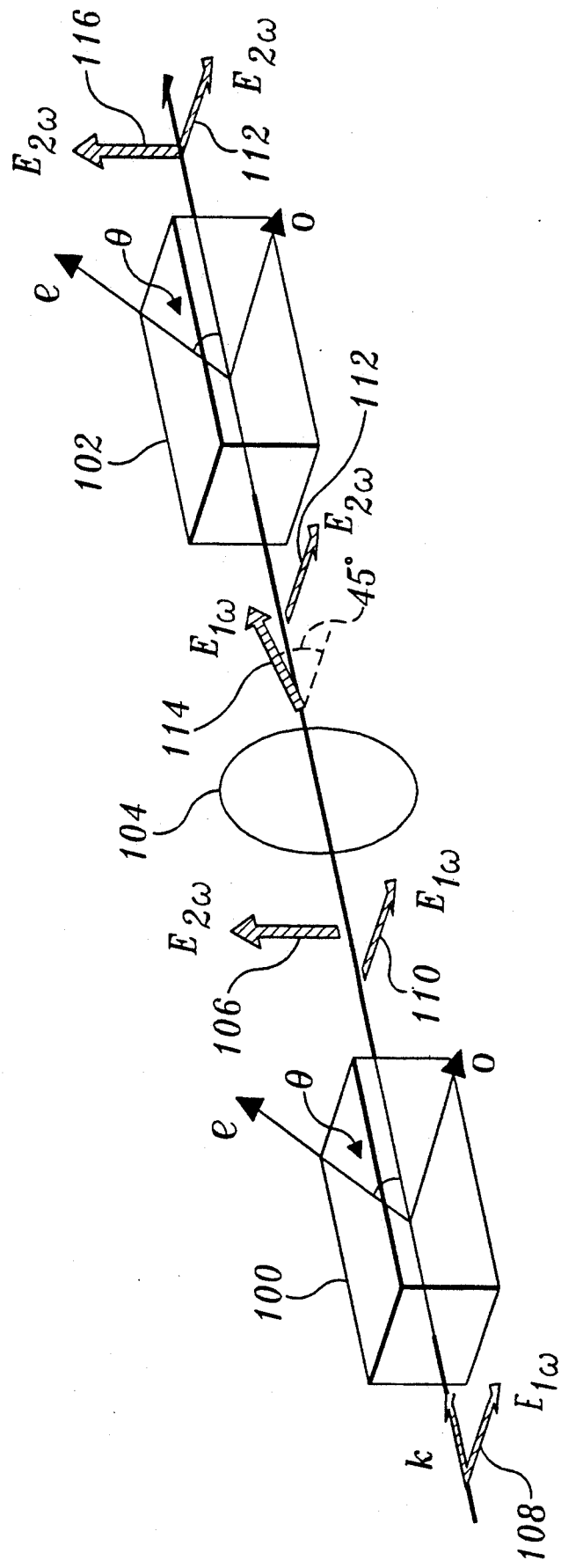
FIG. 9 is an optical schematic view of a second preferred embodiment of the invention.
Figure 10:
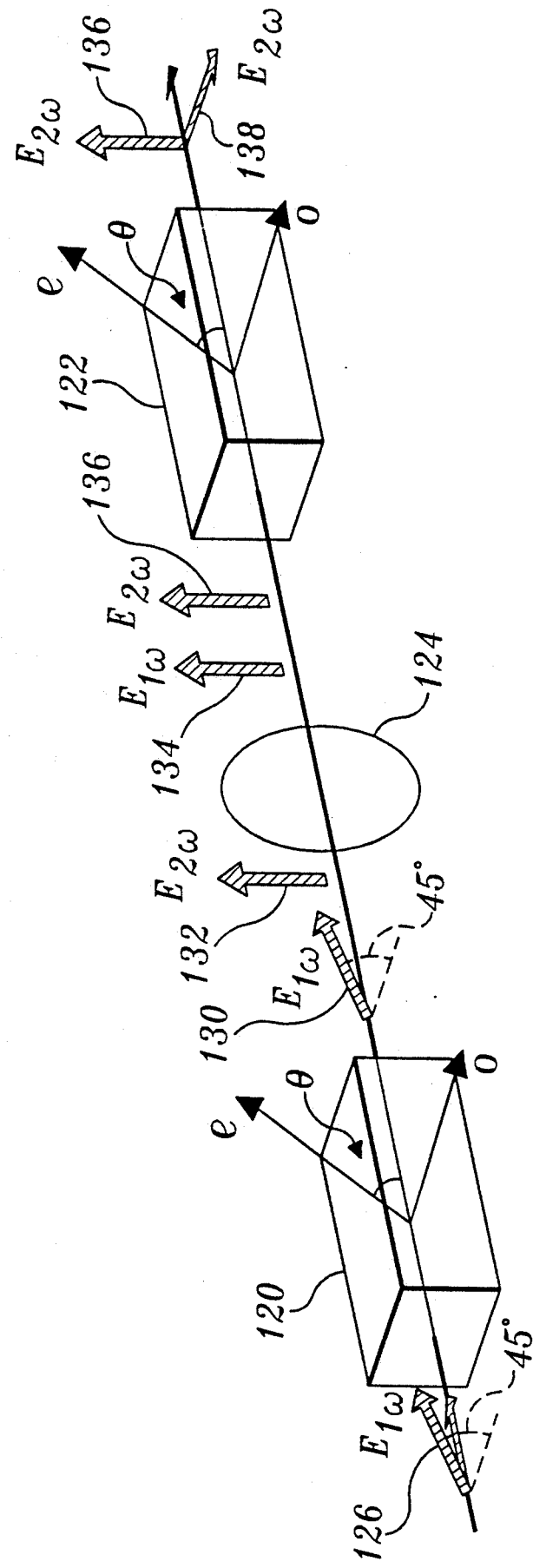
FIG. 10 is an optical schematic view of a third preferred embodiment of the invention.

FIGS. 9 and 10 show a pair of additional embodiments of the invention, in which combinations of Type I and Type II phase-matching are used. Referring initially to FIG. 9, this embodiment comprises nonlinear optical crystals 100 and 102, and waveplate 104. Crystal 100 is arranged for Type I phase-matching, and is thus similar to crystal 12 in the embodiment of FIG. 1. This crystal produces a second harmonic beam 106 with polarization $E_{2\omega}$ that is perpendicular to the polarization of the input beam 108 and residual beam 110. However in this embodiment, the second crystal 102 is arranged for Type II phase-matching. Thus, waveplate 104 rotates the polarizations of the second harmonic beam and the residual beam such that they have relative polarizations of 45° with respect to one another. The polarizations of the second harmonic and residual beams are shown by reference numbers 112 and 114 respectively. The second harmonic beam 112 passes through crystal 102 unaffected, while portions of residual beam 114 are converted into an additional second harmonic beam 116 whose polarization is normal to that of the second harmonic beam 112. Thus as in the prior embodiment, the output is a pair of second harmonic beams having polarizations normal to one another, together with a residual beam (not shown) at the fundamental frequency that can be eliminated by a harmonic beam splitter.

FIG. 10 illustrates a third embodiment comprising crystals 120 and 122, and waveplate 124. In this case, crystal 120 is arranged for type II phase matching, while crystal 122 is arranged for type I phase matching. The fundamental input beam 126 enters first crystal 120 at an angle of 45° with respect to the crystal plane that includes the extraordinary axis, as is standard for type II phase matching. The output of the first crystal is a residual beam 130 having the same polarization as fundamental beam 126, and second harmonic beam 132 that lies in the plane of the first crystal's extraordinary axis. In this case, waveplate 124 rotates these two beams such that their polarizations are parallel to one another, as illustrated by reference numerals 134 and 136 respectively. These beams then enter second crystal 122, which passes second harmonic beam 136 without change, and which converts portions of the residual beam 134 into an additional second harmonic beam 138 normal to the original second harmonic beam 136.

Figure 11:
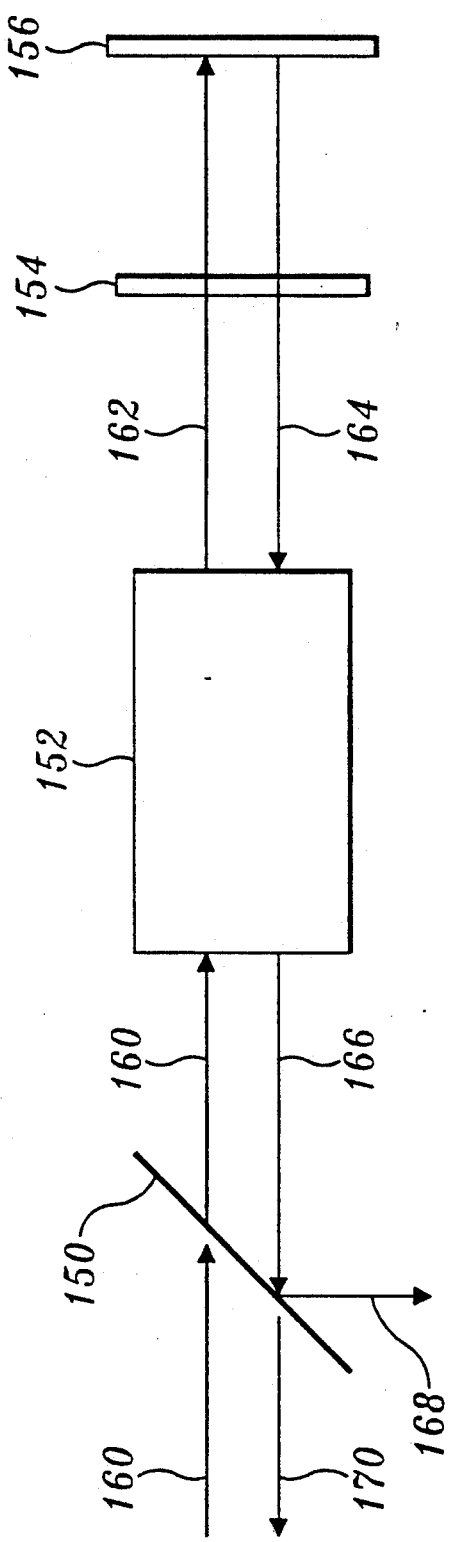
FIG. 11 is an optical schematic view of a fourth preferred embodiment of the invention.

A fourth preferred embodiment of the invention is illustrated in schematic form in FIG. 11. This embodiment includes beam splitter 150, nonlinear crystal 152, waveplate 154, and mirror 156. Beam splitter 150 is as transmissive as possible at the fundamental frequency, and as reflective as possible at the second harmonic frequency. Input beam 160 thus passes through beam splitter 150, and enters crystal 152. In one variation of this embodiment, crystal 152 is positioned and arranged for type I phase matching, with the polarization of input beam 160 with respect to the orientation of the axis of crystal 152 being arranged as shown in FIG. 1. Crystal 152 thus produces output beam 162 that comprises second harmonic and residual beams as in the embodiment of FIG. 1. Waveplate 154 is a full waveplate at the fundamental frequency, and a quarter waveplate at the second harmonic. Thus after beam 162 has been reflected by mirror 156 and made a second passes through the waveplate, the net effect is a full waveplate at the fundamental, and a half waveplate at the second harmonic, similar to the arrangement shown in FIG. 1. The reflected beam 164 then makes a second pass through crystal 152, to produce output beam 166 that comprises a pair of orthogonal second harmonic beams, as shown in FIG. 1, plus a residual beam at the fundamental frequency. The second harmonic beams are reflected by beam splitter 150, to produce output beam 168, while the residual 170 passes through beam splitter 150. The result shown in FIG. 1 has been achieved using the single crystal. However in the FIG. 11 beam 168, while the residual 170 passes through beam splitter 150. The result shown in FIG. 1 has been achieved using the single crystal. However in the FIG. 11 embodiment, waveplate 154 should act on a second harmonic only, and should leave the fundamental unaffected. This is because the crystal is not rotated between passes. In a second variation of the embodiment of FIG. 11, crystal 152 can be arranged for type II phase matching instead of type I phase matching, with the same arrangement.

While the preferred embodiment of the invention has been illustrated and described, it will be appreciated that various changes can be made therein without departing from the spirit and scope of the invention. For example, although the invention has been described using nonlinear optical crystals, other nonlinear components, such as organic films, may also be used. Each conversion means could also comprise multiple nonlinear optical crystals.

The embodiments of the invention in which an exclusive property or privilege is claimed are defined as follows:

1. An optical frequency conversion apparatus for receiving an optical input beam having a first frequency and a polarization, and for producing an optical output beam at a second frequency equal to twice the first frequency, the apparatus comprising:
   a first nonlinear conversion means positioned to receive the input beam, the first nonlinear conversion means being constructed and oriented such that a portion of the input beam is converted into a first higher frequency beam at the second frequency, and such that the first higher frequency beam leaves the first nonlinear conversion means approximately colinearly with a residual beam comprising a portion of the input beam not converted into the first higher frequency beam;
   waveplate means for producing a relative rotation between the polarization of the first higher frequency beam and the polarization of the residual beam; and
   a second nonlinear conversion means positioned in the path of the first higher frequency beam and the residual beam, the second nonlinear conversion means being constructed and oriented such that a portion of the residual beam is converted into a second higher frequency beam at the second frequency, the first and second higher frequency beams comprising the output beam, the polarizations of the first and second higher frequency beams being orthogonal to one another.

2. The apparatus of claim 1, wherein the polarization of the first higher frequency beam is orthogonal to the input beam.

3. The apparatus of claim 1, wherein the polarization of the first higher frequency beam is oriented at an angle of 45° relative to the polarization of the input beam.

4. The apparatus of claim 1, wherein the polarization of the second higher frequency beam is orthogonal to the polarization of the residual beam.

5. The apparatus of claim 1, wherein the polarization of the second higher frequency beam is oriented at an angle of 45° relative to the polarization of the residual beam.

6. The apparatus of claim 1, 2, or 4, wherein the waveplate means comprises a net full-waveplate at the first frequency and a net half-waveplate at the second frequency, and wherein the waveplate means is oriented to rotate the polarization of the first higher frequency beam about its axis of propagation by a net angle of 90°.

7. The apparatus of claim 1, 2, or 4, wherein the waveplate means comprises a full-waveplate at the second frequency and a half-waveplate at the first frequency, and wherein the waveplate means is oriented to rotate the polarization of the residual beam about its axis of propagation by a net angle of 90°.

8. The apparatus of claim 1, 2, or 5, wherein the waveplate means comprises a net full-waveplate at the first frequency and a net half-waveplate at the second frequency, and wherein the waveplate means is oriented to rotate the polarization of the first higher frequency beam about its axis of propagation by a net angle of 45°.

9. The apparatus of claim 1, 2, or 5, wherein the waveplate means comprises a net full-waveplate of the second frequency and a net half-waveplate at the first frequency, and wherein the waveplate means is oriented to rotate the polarization of the residual beam about its axis of propagation by a net angle of 45°.

10. The apparatus of claim 1, 3, or 5, wherein the waveplate means comprises a net full-waveplate at the first frequency and a net half-waveplate at the second frequency, and wherein the waveplate means is oriented to rotate the polarization of the first higher frequency beam about its axis of propagation by a net angle of 45°, such that the polarizations of the first higher frequency beam and the residual beam are both parallel to the input polarization.

11. The apparatus of claim 1, 3, or 4, wherein the waveplate means comprises a net full-waveplate at the second frequency and a net half-waveplate at the first frequency, and wherein the waveplate means is oriented to rotate the polarization of the residual beam about its axis of propagation by a net angle of 45°, such that the polarizations of the first higher frequency beam and the residual beam are parallel to one another and rotated relative to the polarization of the input beam by an angle of 45°.

12. The apparatus of claim 1, wherein the first and second conversion means each comprises a uniaxial crystal.

13. The apparatus of claim 1, wherein the first and second conversion means each comprises a biaxial crystal.

14. An optical frequency conversion apparatus for receiving an optical input beam having a first frequency and a polarization, and for producing an optical output beam at a second frequency equal to twice the first frequency, the apparatus comprising:
   a beam splitter transmissive at the first frequency and reflective at the second frequency, the beam splitter being positioned such that it receives the input beam and transmits the input beam to produce a transmitted input beam;

nonlinear conversion means positioned to receive the transmitted input beam, the nonlinear conversion means being constructed and oriented such that a portion of the transmitted input beam is converted into a first higher frequency beam at the second frequency, and such tha the first higher frequency beam leaves the nonlinear conversion means approximately colinearly with a residual beam comprising a portion of the transmitted input beam not converted into the first higher frequency beam;

waveplate means comprising a quarter waveplate at the second frequency and a full waveplate at the first frequency, the waveplate being positioned such that the first higher frequency beam and the residual beam pass through the waveplate;

a mirror positioned to reflect the first higher frequency beam and residual beam back through the waveplate and nonlinear conversion means, such that the waveplate again acts as a quarter waveplate for the first higher frequency beam, and such that the nonlinear conversion means produces a second higher frequency beam at the second frequency having a polarization orthogonal to that of the first higher frequency beam, and such that the beam splitter transmits the residual beam and reflects the first and second higher frequency beams to produce the output beam.

* * * * *